United States Patent
Sano (10) Patent No.: US 8,524,396 B2
(45) Date of Patent: Sep. 3, 2013

(54) METHOD OF MANUFACTURING ACTIVE MATERIAL, ACTIVE MATERIAL, ELECTRODE USING THE SAME, AND LITHIUM-ION SECONDARY BATTERY EQUIPPED THEREWITH

(75) Inventor: Atsushi Sano, Tokyo (JP)

(73) Assignee: TDK Corporation, Tokyo (JP)

( * ) Notice: Subject to any disclaimer, the term of this patent is extended or adjusted under 35 U.S.C. 154(b) by 382 days.

(21) Appl. No.: 12/723,256

(22) Filed: Mar. 12, 2010

(65) Prior Publication Data
US 2010/0233541 A1    Sep. 16, 2010

(30) Foreign Application Priority Data
Mar. 16, 2009  (JP) ................ P2009-063162

(51) Int. Cl.
*H01M 4/00*  (2006.01)
*C01G 1/00*  (2006.01)
*C01G 58/00* (2006.01)
*C22B 1/00*  (2006.01)

(52) U.S. Cl.
USPC ........... 429/221; 429/209; 423/138; 423/364; 423/367

(58) Field of Classification Search
None
See application file for complete search history.

(56) References Cited

U.S. PATENT DOCUMENTS

| | | | |
|---|---|---|---|
| 7,338,647 B2 * | 3/2008 | Huang et al. | ............. 423/306 |
| 7,618,747 B2 | 11/2009 | Audemer et al. | |
| 2006/0035150 A1 * | 2/2006 | Audemer et al. | ............. 429/221 |
| 2009/0072203 A1 | 3/2009 | Audemer et al. | |

FOREIGN PATENT DOCUMENTS

| | | |
|---|---|---|
| CN | 101106189 A | 1/2008 |
| CN | 101339992 A | 1/2009 |
| JP | A-2005-530676 | 10/2005 |
| JP | A-2008-159495 | 7/2008 |
| JP | A-2009-081002 | 4/2009 |

* cited by examiner

*Primary Examiner* — Cynthia Walls
(74) *Attorney, Agent, or Firm* — Oliff & Berridge, PLC (57) ABSTRACT

A method of manufacturing an active material having a sufficient discharge capacity at a high discharge current density, an active material obtained thereby, an electrode using the same, and a lithium-ion secondary battery equipped therewith are provided. The method of manufacturing an active material comprises a step of polymerizing a mixture containing an Fe ion, an Li ion, a $PO_4$ ion, a hydroxy acid, and a polyol, the mixture containing the polyol by a molar ratio 1.3 to 16 times that of the hydroxy acid, so as to yield a polymer; and a step of heating the polymer, so as to yield an active material containing an active material particle and carbon. The active material particle is mainly composed of $LiFePO_4$.

5 Claims, 4 Drawing Sheets

METHOD OF MANUFACTURING ACTIVE MATERIAL, ACTIVE MATERIAL, ELECTRODE USING THE SAME, AND LITHIUM-ION SECONDARY BATTERY EQUIPPED THEREWITH

BACKGROUND OF THE INVENTION

1. Field of the Invention

The present invention relates to a method of manufacturing an active material, an active material, an electrode using the active material, and a lithium-ion secondary battery equipped with the electrode.

2. Related Background Art $LiFePO_4$ has been under study as one of positive electrode active materials for lithium-ion secondary batteries from the viewpoint of safety during operations of the batteries. However, $LiFePO_4$ is inferior to $LiCoO_2$, for example, in terms of electronic and ionic conductivities. Therefore, lithium-ion secondary batteries using $LiFePO_4$ as their positive electrode active material have been hard to yield a sufficient discharge capacity at a high discharge current density.

Japanese Translated International Patent Application Laid-Open No. 2005-530676 discloses a method of making a powder of $LiFePO_4$ having a surface covered with carbon. According to the method described in the Patent Document: the above-mentioned electrode active material is manufactured by mixing a solution in which a polyhydric alcohol and a polycarboxylic acid are mixed, an Li salt, an Fe salt, and a phosphate; polymerizing the polyhydric alcohol and polycarboxylic acid by dehydration condensation; and heating thus obtained polymer.

SUMMARY OF THE INVENTION

However, the $LiFePO_4$ powder obtained by the above-mentioned method has still failed to attain sufficient electronic and ionic conductivities, thus falling short of yielding an electrode active material having a sufficient discharge capacity at a high discharge current density.

It is therefore an object of the present invention to provide a method of manufacturing an active material capable of yielding a sufficient discharge capacity at a high discharge current density, the active material, an electrode using the active material, and a lithium-ion secondary battery equipped with the electrode.

The method of manufacturing an active material in accordance with the present invention comprises a step of polymerizing a mixture containing an Fe ion, an Li ion, a $PO_4$ ion, a hydroxy acid, and a polyol, the mixture containing the polyol by a molar ratio 1.3 to 16 times that of the hydroxy acid, so as to yield a polymer; and a step of heating the polymer, so as to yield an active material containing an active material particle and carbon, the active material particle being mainly composed of $LiFePO_4$.

In the mixture containing the Fe ion, Li ion, $PO_4$ ion, hydroxy acid, and polyol, the hydroxy acid is coordinated to the Fe, Li, or $PO_4$ ion, so as to form their complex, thereby allowing the Fe, Li, and $PO_4$ ions to disperse into the polyol. The mixture in which the ratio of the polyol content to the hydroxy acid content is 1.3 to 16 in terms of molar is polymerized, and the resulting polymer is heated, whereby an active material containing an active material particle mainly composed of $LiFePO_4$ and carbon can be obtained. Thus obtained active material has a sufficient discharge capacity at a higher discharge current density as compared with the conventional active materials containing active material particles mainly composed of $LiFePO_4$ and carbon.

Preferably, iron nitrate is a source for the Fe ion, lithium chloride is a source for the Li ion, and ammonium hydrogen phosphate is a source for the $PO_4$ ion.

Iron nitrate, lithium chloride, and ammonium hydrogen phosphate are suitable as sources for supplying the Fe, Li, and $PO_4$ ions, respectively.

The active material in accordance with the present invention comprises an active material particle group constructed by aggregating active material particles, mainly composed of $LiFePO_4$, having an orientation to a (020) plane and a crystallite size of 30 to 99 nm, and carbon particles supported on a surface of the active material particle.

Since a peak having the orientation to the (020) plane, i.e., the peak attributable to the (020) plane in all the diffraction peaks obtained by powder X-ray diffractometry, exhibits the strongest peak intensity, the active material particles mainly composed of $LiFePO_4$ in accordance with the present invention has an orientation to planes perpendicular to the b axis. Since Li ion diffusion paths in the crystal structure of $LiFePO_4$ exist along the b axis alone, Li ions in an electrolytic solution can easily diffuse into crystal structures of active material particles which tend to have an orientation to planes perpendicular to the b axis. It seems that, since the crystallite size is small, i.e., 30 to 99 nm, Li ions are easier to diffuse into crystal lattices of $LiFePO_4$, thus facilitating the insertion and desorption of Li ions. Supporting carbon particles on a surface of the active material particle improves the electronic conductivity as well. The active material comprising an active material particle group constructed by aggregating such active material particles and the carbon particles supported on the surface of the active material particle has a sufficient discharge capacity at a high discharge current density.

The electrode in accordance with the present invention comprises a current collector and an active material layer, disposed on the current collector, containing the above-mentioned active material. This can yield an electrode having a large discharge capacity.

The lithium-ion secondary battery in accordance with the present invention comprises the above-mentioned electrode. This can yield a lithium-ion secondary battery having a large discharge capacity.

The present invention can provide a method of manufacturing an active material having a sufficient discharge capacity at a high discharge current density, an electrode using the same, and a lithium-ion secondary battery equipped therewith.

DESCRIPTION OF THE PREFERRED EMBODIMENTS

In the following, a preferred embodiment of the present invention will be explained in detail with reference to the accompanying drawings. Ratios of dimensions in the drawings do not always match those in practice.

<Method of Manufacturing Active Material>

The method of manufacturing an active material in accordance with this embodiment comprises a polymer forming step and a heat treatment step.

[Polymer Forming Step]

Material Mixture

First, in the polymer forming step, a material mixture is prepared. The material mixture contains an Fe ion, an Li ion, a $PO_4$ ion, a hydroxy acid, and a polyol.

Examples of Fe ion sources, i.e., materials for supplying the Fe ion, include $Fe(NO_3)_3 \cdot 2H_2O$, $FeCl_2$, $FeCl_3$, and $Fe_2SO_4$.

Examples of Li ion sources, i.e., materials for supplying the Li ion, include LiCl, $Li(OOCCH_3) \cdot 9H_2O$, LiOH, and $Li_2CO_3$.

Examples of $PO_4$ ion sources, i.e., materials for supplying the $PO_4$ ion, include $NH_4H_2(PO_4)$, $H_3PO_4$, and $Li_3PO_4$.

In a preferred combination of them, the Fe ion source is iron nitrate, the Li ion source is lithium chloride, and the $PO_4$ ion source is ammonium hydrogen phosphate.

Examples of the hydroxy acid, which is an organic compound having a carboxyl group and a hydroxyl group, include citric acid, tartaric acid, citramalic acid, isocitric acid, leucic acid, mevalonic acid, pantoic acid, ricinoleic acid, ricinelaidic acid, and cerebronic acid. A plurality of hydroxy acids may be mixed as well.

Examples of the polyol, which is an organic compound having at least two hydroxyl groups, include glycols in which hydroxyl groups are bonded respectively to two carbon atoms of a chain or cyclic aliphatic hydrocarbon and glycerin. The carbon number is preferably 1 to 4. Preferred in particular among polyols are ethylene glycol, propylene glycol, and diethylene glycol.

In the material mixture, the molar ratio of the polyol content to the hydroxy acid content is 1.3 to 16, preferably 5 to 16, more preferably 8 to 16. When the molar ratio of the polyol content to the hydroxy acid content falls within the range mentioned above, an active material containing an active material particle with a small crystallite size, mainly composed of $LiFePO_4$ having orientation to the (020) plane, and carbon particles supported on a surface of the active material particle can be obtained, though the reason therefor is unclear.

For preparing the material mixture, it will be sufficient if the Fe ion source, Li ion source, $PO_4$ ion source, hydroxy acid, and polyol are mixed such that the ratio of the polyol content to the hydroxy acid content falls within the range mentioned above. When mixing the Fe ion source, Li ion source, $PO_4$ ion source, hydroxy acid, and polyol, a polar solvent such as water may be mixed therewith. While the above-mentioned ion sources, a necessary amount of water, the hydroxy acid, and the polyol may be mixed in any order in this case, the ion sources are preferably dissolved in the polar solvent such as water at first from the viewpoint of making it easier for the ion sources to ionize.

In such a material mixture, hydroxy acid complexes of the Fe, Li, and $PO_4$ ions seem to be formed in the polyol.

The material mixture is subsequently heated, for example, so as to cause dehydration condensation (esterification) between the carboxyl group of the hydroxy acid and the hydroxyl group of the polyol. This allows the polyol to network the hydroxy acid complexes, thereby yielding a gelled polymer, for example. Here, the heating temperature may be 80 to 250° C., though not restricted in particular. The material mixture may be heated to 80 to 120° C. at first, so that the dehydration condensation proceeds sufficiently, thereby yielding a polymer, and then to 120 to 250° C., so as to remove the part of hydroxy acid and polyol left without the condensation reaction from the polymer. It will be sufficient if the heating temperature at the time of the polymerization reaction (dehydration condensation reaction) is set not higher than the boiling points or decomposition temperatures of the hydroxy acid and polyol used.

[Heat-treatment Step]

Next, the polymer is heated, so as to form an active material particle mainly composed of $LiFePO_4$, while skeletons derived from the hydroxy acid and polyol constructed by carbon, oxygen, and hydrogen atoms are decomposed, so as to be carbonized. Though conditions under which the firing and decomposing reactions of the active material particle are generated are not restricted in particular, it will be sufficient if the polymer is heated for 1 to 20 hr at a temperature of about 300 to 1200° C. in an atmosphere with a low oxygen partial pressure, such as a nitrogen, argon, or vacuum atmosphere, for example.

When thus obtained active material containing the active material particle and the carbon is used as a positive electrode active material of a lithium-ion secondary battery, a sufficient discharge capacity can be obtained even at a high discharge current density (discharge rate).

<Active Material>

Figure 1:
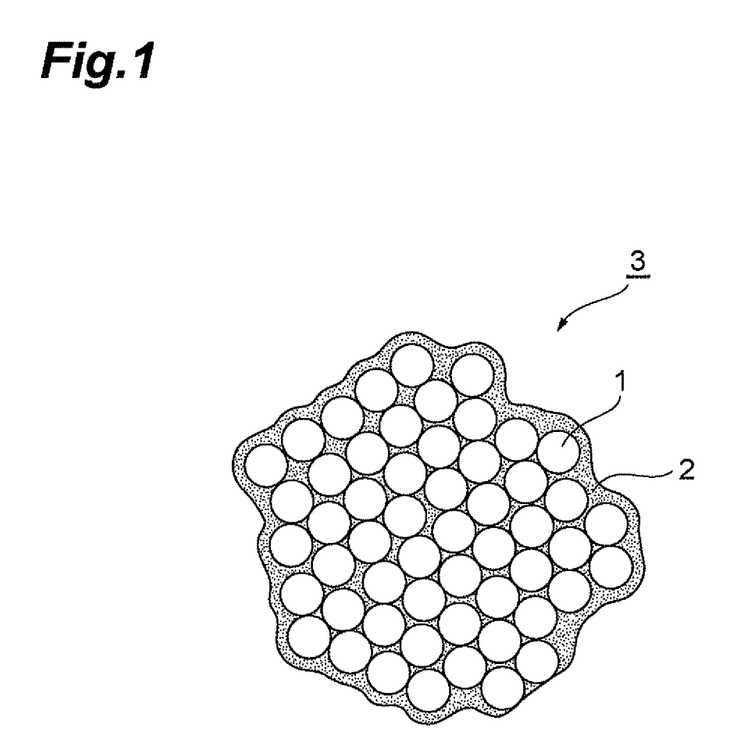
[FIG. 1] is a schematic sectional view illustrating active material particles in accordance with an embodiment of the present invention.

The active material obtained by the above-mentioned method of manufacturing an active material in accordance with this embodiment will now be explained in detail. FIG. 1 is a schematic sectional view of the active material in accordance with this embodiment. The active material 3 contains an active material particle group constructed by aggregating active material particles 1 and a carbon layer 2 constituted by carbon particles supported on the surfaces of the active material particles 1. It seems that the carbon particles (not depicted), each of which is supported on the surface of one active material particle 1, are so small that they form the carbon layer 2 as a mass.

[Active Material Particle]

The active material particle 1 is mainly composed of $LiFePO_4$ and has an orientation to a (020) plane and a crystallite size of 30 to 99 nm.

Here, "having an orientation to a (020) plane" means that the peak attributable to the (020) plane exhibits the strongest peak intensity in all the diffraction peaks obtained by powder X-ray diffractometry.

The crystal structure of $LiFePO_4$ can be identified according to ICSD, ICDD, or the like by three peaks having relatively high peak intensities in all the peaks measured. The three peaks having relatively high peak intensities appear where $2\theta = 25.6°$, $29.7°$, and $35.8°$. The peaks where $2\theta = 25.6°$, $29.7°$, and $35.8°$ are attributable to (111), (020), and (311) planes, respectively. That is, "having an orientation to a (020) plane" more specifically means that the peak intensity attributable to the (020) plane is at least 1.00 times that attributable to the (111) plane and at least 1.00 times that attributable to the (311) plane. Hence, it means that the peak attributable to the (020) plane exhibits the strongest peak intensity among all the diffraction peaks.

The crystallite size is 30 to 99 nm, preferably 30 to 65 nm, more preferably 35 to 60 nm. Here, the crystallite means the largest mass that can be counted as a single crystal. The relationship between the crystallite in accordance with this embodiment and the active material particle constituted by the crystallite will now be explained. A primary particle of the active material particle 1 may be constituted by one crystallite or a plurality of crystallites.

When the primary particle of the active material particle 1 is constituted by one crystallite, the average primary particle size of the active material particles 1 equals the size of one crystallite, so that the active material particles 1 reduce their average primary particle size and increase their specific surface area, whereby lithium ions seem to be easier to diffuse, so as to be easily inserted and desorbed.

When the primary particle of the active material particle 1 is constituted by a plurality of crystallites, the crystallite size is so small that the number of crystallites in the primary particle of the active material particle 1 increases, whereby adjacent crystallites form greater crystal grain boundaries. It seems that, since the lithium ion diffusion speed is higher in the crystal boundaries than in the crystallites, lithium ions are easier to diffuse into crystal lattices of $LiFePO_4$, thereby facilitating their insertion and desorption.

The crystallite size can be calculated, for example, by measuring a full width at half maximum by an X-ray diffractometer and inputting thus obtained value into the following Scherrer equation:

$$\text{Crystallite size (Å)} = K \cdot \lambda / (\beta \cdot \cos \theta) \quad (1)$$

Wherein K is the Scherrer factor, $\lambda$, is the wavelength of the X-ray tube, $\beta$ is the measured full width at half maximum, and $\theta$ is the value computed by multiplying the measured $2\theta$ by ½.

The term "mainly composed of $LiFePO_4$" means that the amount of $LiFePO_4$ in the active material particle 1 is at least 90% by mass, more preferably at least 95% by mass. It may contain minute amounts of unreacted material components and the like in addition to $LiFePO_4$.

Since the active material particles mainly composed of $LiFePO_4$ have an orientation to the (020) plane, a crystallite size of 30 to 99 nm, and carbon particles supported on their surfaces, the ionic and electronic conductivities can be improved at the same time, whereby a sufficient discharge capacity can be obtained even when the discharge current density is high. It can be very hard to make an active material particle having a crystallite size of 30 nm or less. When the crystallite size is 99 nm or greater, the increase in the specific surface area or crystal boundaries of the active material particles tends to become smaller, thereby making it harder to obtain the effect of improving the lithium ion diffusion.

<Lithium-Ion Secondary Battery>

A lithium-ion secondary battery using the active material obtained by the method of manufacturing an active material as a positive electrode active material will now be explained in brief with reference to FIG. 2.

A lithium-ion secondary battery 100 mainly comprises a multilayer body 30, a case 50 accommodating the multilayer body 30 in a closed state, and a pair of leads 60, 62 connected to the multilayer body 30.

The multilayer body 30 is one in which a pair of electrodes 10, 20 oppose each other through a separator 18 interposed therebetween. The positive electrode 10 has a positive electrode current collector 12 and a positive electrode active material layer 14 formed on the positive electrode current collector 12. The negative electrode 20 has a negative electrode current collector 22 and a negative electrode active material layer 24 formed on the negative electrode current collector 22. The positive electrode active material layer 14 and negative electrode active material layer 24 are in contact with the separator 18 on both sides. The leads 60, 62 are connected to respective end parts of the negative electrode current collector 22 and the positive electrode current collector 12 and each have an end portion extending to the outside of the case 50.

[Positive Electrode]

Figure 2:
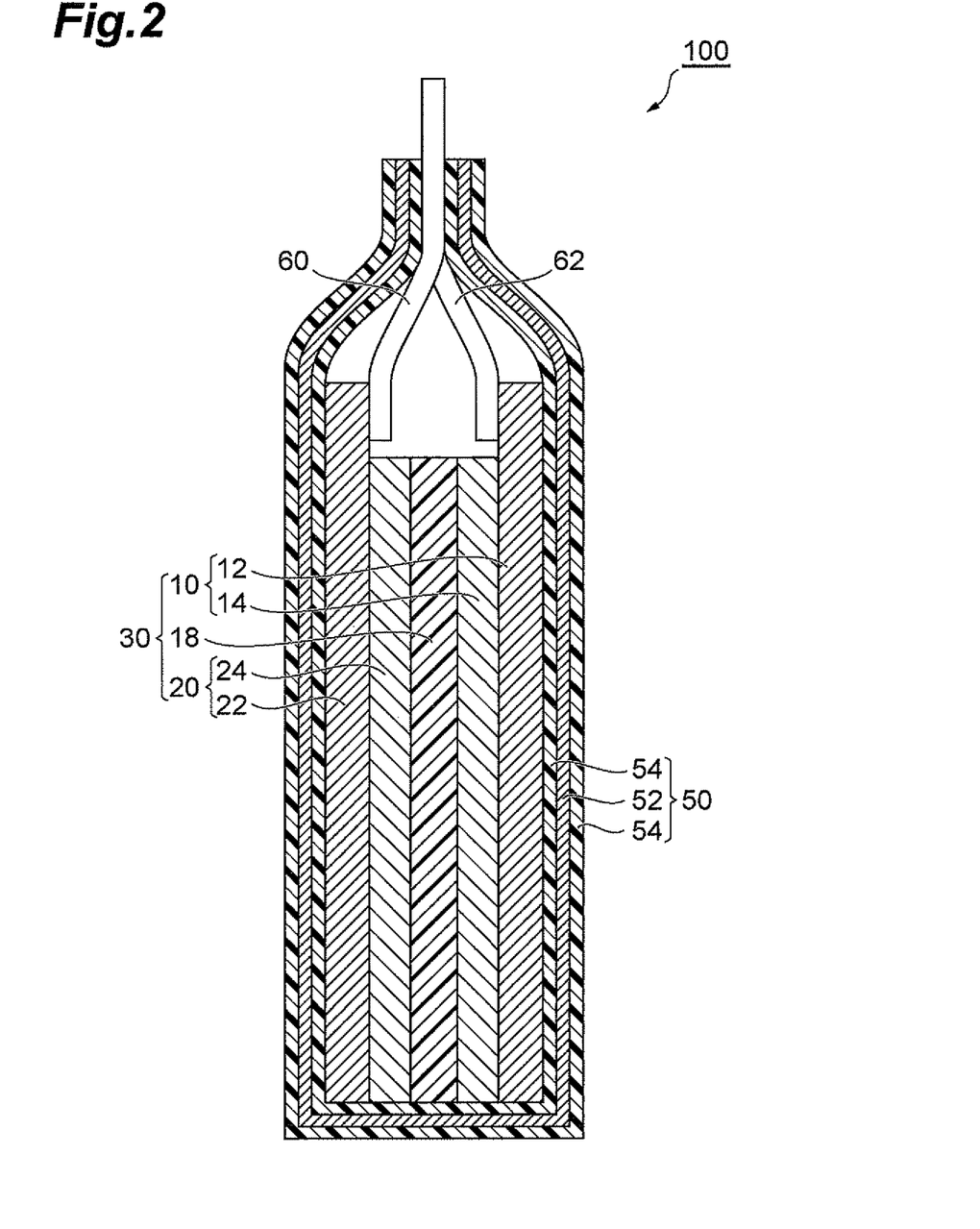
[FIG. 2] is a schematic sectional view of a lithium-ion secondary battery in accordance with an embodiment of the present invention.

As illustrated in FIG. 2, the positive electrode 10 has the planar (film-like) positive electrode current collector 12 and the positive electrode active material layer 14 formed on the positive electrode current collector 12.

The positive electrode current collector 12 may be any conductive planar material, examples of which include thin metal sheets made of aluminum, copper, and nickel foils. The positive electrode active material layer 14 mainly comprises the above-mentioned active material 3 and a binder. The positive electrode active material layer 14 may further contain a conductive auxiliary.

The binder binds active material particles to each other and the active material and the positive electrode current collector 12 to each other.

The binder may be made of any material as long as it can achieve the binding mentioned above. Examples of the binder include fluororesins such as polyvinylidene fluoride (PVDF), polytetrafluoroethylene (PTFE), tetrafluoroethylene/hexafluoropropylene copolymers (FEP), tetrafluoroethylene/perfluoroalkylvinylether copolymers (PFA), ethylene/tetrafluoroethylene copolymers (ETFE), polychlorotrifluoroethylene (PCTFE), ethylene/chlorotrifluoroethylene copolymers (ECTFE), and polyvinyl fluoride (PVF).

Other examples of the binder include fluororubbers based on vinylidene fluoride such as vinylidene fluoride/hexafluoropropylene-based fluororubbers (VDF/HFP-based fluororubbers), vinylidene fluoride/hexafluoropropylene/tetrafluoroethylene-based fluororubbers (VDF/HFP/TFE-based fluororubbers), vinylidene fluoride/pentafluoropropylene-based fluororubbers (VDF/PFP-based fluororubbers), vinylidene fluoride/pentafluoropropylene/tetrafluoroethylene-based fluororubbers (VDF/PFP/TFE-based fluororubbers), vinylidene fluoride/perfluoromethylvinylether/tetrafluoroethylene-based fluororubbers (VDF/PFMVE/TFE-based fluororubbers), and vinylidene fluoride/chlorotrifluoroethylene-based fluororubbers (VDF/CTFE-based fluororubbers).

Still other examples of the binder include polyethylene, polypropylene, polyethylene terephthalate, aromatic polyamides, cellulose, styrene/butadiene rubber, isoprene rubber, butadiene rubber, and ethylene/propylene rubber. Also usable are thermoplastic elastomeric polymers such as styrene/butadiene/styrene block copolymers and their hydrogenated derivatives, styrene/ethylene/butadiene/styrene copolymers, and styrene/isoprene/styrene block copolymers and their hydrogenated derivatives. Further, syndiotactic 1,2-polybutadiene, ethylene/vinyl acetate copolymers, propylene-α-olefin copolymers (having a carbon number of 2 to 12), and the like may be used.

Electronically and ionically conductive polymers may also be used as the binder. An example of the electronically conductive polymer is polyacetylene. In this case, the binder also functions as conductive auxiliary particles, thereby making it unnecessary to add conductive auxiliaries thereto.

As the ionically conductive polymer, one which conducts ions such as lithium ions can be used, for example. Its examples include those in which monomers of polymer compounds (polyether-based polymer compounds such as polyethylene oxide and polypropylene oxide, crosslinked polymers of polyether compounds, polyepichlorohydrin, polyphosphazene, polysiloxane, polyvinylpyrrolidone, polyvinylidene carbonate, polyacrylonitrile, and the like) are complexed with lithium salts or alkali metal salts mainly composed of lithium such as $LiClO_4$, $LiBF_4$, $LiPF_6$, $LiAsF_6$, LiCl, LiBr, $Li(CF_3SO_2)_2N$, and $LiN(C_2F_5SO_2)_2$. Examples of polymerization initiators used for complexing include photopolymerization initiators and thermal polymerization initiators suitable for the monomers mentioned above.

Preferably, the binder content in the active material layer 24 is 0.5 to 6% by mass based on the mass of the active material layer. When the binder content is less than 0.5% by mass, the amount of the binder tends to be too small to form a strong active material layer. When the binder content exceeds 6% by mass, by contrast, a greater amount of the binder tends to be kept from contributing to the electric capacity, thereby making it harder to yield a sufficient volume energy density. In particular, when the binder has a low electronic conductivity in this case, the active material layer tends to increase its electric resistance, thereby failing to yield a sufficient electric capacity.

Examples of the conductive auxiliary include carbon blacks, carbon materials, fine powders of metals such as copper, nickel, and iron, mixtures of the carbon materials and fine metal powders, and conductive oxides such as ITO.

[Method of Manufacturing the Positive Electrode]

The above-mentioned active material, binder and a necessary amount of a conductive auxiliary are added to a solvent, so as to prepare a slurry. Examples of the solvent include N-methyl-2-pyrrolidone and N,N-dimethylformamide. The slurry containing the active material, binder, and the like may be applied to the surface of the positive electrode current collector 12 and dried.

[Negative Electrode]

The negative electrode 20 comprises the planar negative electrode current collector 22 and the negative electrode active material layer 24 formed on the negative electrode current collector 22. As the negative electrode current collector 22, binder, and conductive auxiliary, those similar to their equivalents in the positive electrode can be used. As the negative electrode active material, known negative electrode active materials for batteries can be used without being restricted in particular. Examples of the negative electrode active material include carbon materials such as graphite, non-graphitizing carbon, graphitizable carbon, and low-temperature-firable carbon which can occlude and release (intercalate and deintercalate or be doped and undoped with) lithium ions; metals such as Al, Si, and Sn which are combinable with lithium; amorphous compounds mainly composed of oxides such as $SiO_2$ and $SnO_2$; and particles containing lithium titanate ($Li_4Ti_5O_{12}$) and the like.

[Electrolytic Solution]

The electrolytic solution is one contained within the positive electrode active material layer 14, negative electrode active material layer 24, and separator 18. The electrolytic solution is not limited in particular. For example, an electrolytic solution (an aqueous electrolytic solution or an electrolytic solution using an organic solvent) containing a lithium salt can be used in this embodiment. Since the tolerable voltage of aqueous electrolytic solutions during charging is limited to a low level because of their electrochemically low decomposition voltage, electrolytic solutions using organic solvents (nonaqueous electrolytic solutions) are preferred. As the electrolytic solution, one dissolving a lithium salt into a nonaqueous solvent (organic solvent) is preferably used. Examples of the lithium salt include salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. These salts may be used either singly or in combinations of two or more.

Preferred examples of the organic solvent include propylene carbonate, ethylene carbonate, and diethyl carbonate. They may be used either singly or in combinations of two or more in given ratios.

In this embodiment, the electrolytic solution may be not only a liquid but also a gelled electrolyte obtained by adding a gelling agent thereto. A solid electrolyte (a solid polymer electrolyte or an electrolyte made of an ionically conductive inorganic material) may be contained in place of the electrolytic solution.

The separator 18 may be formed by an electrically insulating porous structure. Its examples include monolayer or multilayer bodies of films constituted by any of polyethylene, polypropylene, and polyolefin, extended films of mixtures of these resins, and fibrous nonwovens constituted by at least one kind of constituent material selected from the group consisting of cellulose, polyester, and polypropylene.

The case 50 is one which seals the multilayer body 30 and electrolytic solution therein. The case 50 is not limited in particular as long as it can inhibit the electrolytic solution from leaking out therefrom and moisture and the like from invading the lithium-ion secondary battery 100 from the outside. For example, as illustrated in FIG. 2, a metal-laminated film in which a metal foil 52 is coated with polymer films 54 on both sides can be utilized as the case 50. An aluminum foil can be used as the metal foil 52, for example, while films of polypropylene and the like can be used as the polymer films 54. Preferred examples of the material for the outer polymer film 54 include polymers having a high melting point such as polyethylene terephthalate (PET) and polyimide. Preferred examples of the material for the inner polymer film 54 include polyethylene and polypropylene.

The leads 60, 62 are formed from a conductive material such as aluminum.

Known methods may be used to weld the leads 60, 62 to the negative electrode current collector 22 and positive electrode current collector 12, respectively, insert the positive electrode active material layer 14 of the positive electrode 10 and the negative electrode active material layer 24 of the negative electrode 20 holding the separator 18 therebetween into the case 50 together with the electrolytic solution, and then seal the inlet of the case 50.

Though a preferred embodiment of the method of manufacturing an active material, the active material obtained thereby, the electrode containing the active material, and the lithium-ion secondary battery equipped with the electrode is explained in detail in the foregoing, the present invention is not limited to the above-mentioned embodiment.

For example, the active material can also be used as an electrode material for electrochemical devices other than the lithium-ion secondary battery. Examples of such electrochemical devices include secondary batteries other than the lithium-ion secondary battery, e.g., metallic lithium secondary batteries (using an electrode containing the active material of the present invention as a cathode and metallic lithium as an anode), and electrochemical capacitors such as lithium capacitors. These electrochemical devices can be used for power supplies for self-propelled micromachines, IC cards, and the like and decentralized power supplies placed on or within printed boards.

EXAMPLE 1

[Making of an Active Material]

An aqueous solution A was obtained by weighing 16.16 g (40 mol) of iron nitrate ($Fe(NO_3)_3 \cdot 2H_2O$), 1.70 g (40 mol) of lithium chloride (LiCl), and 5.28 g (40 mol) of ammonium hydrogen phosphate ($NH_4H_2(PO_4)$)) and dissolving them into 30 ml of water. A mixture solution B was obtained by mixing 40 ml of citric acid monohydrate and 60 mol of ethylene glycol with the aqueous solution A. The mixing ratio between citric acid and ethylene glycol was 1:1.5. As ethylene glycol, one mixed with ethanol at a volume ratio of 1:4 beforehand was used.

Thus obtained mixture solution B was stirred for 3 hr at 120° C., so that a dehydration condensation reaction of the material compounds proceeded, and then was stirred for 1 hr at 180° C. The resulting polymer was heated at 1° C./min under an argon gas flow, heat-treated for 12 hr at 800° C. in the argon atmosphere, and then pulverized, so as to yield an active material.

[Identification of active material particles by X-ray diffractometry, calculation of peak intensity ratios (d(020)/d(111) and d(020)/d(311)), and measurement of the crystallite size]

Thus obtained active material was subjected to X-ray diffractometry. It was seen that, among a plurality of peaks, relatively strong peaks were obtained where 2θ=25.6', 29.7°, and 35.8°, whereby the active material mainly contained $LiFePO_4$.

The peaks where 2θ=25.6', 29.7°, and 35.8° were attributable to (111), (020), and (311), respectively. Table 1 lists the peak intensity ratio (d(020)/d(111)) between the peaks where 2θ=29.7° and 25.6° and the peak intensity ratio (d(020)/d(311)) between the peaks where 2θ=29.7° and 35.8°.

The crystallite size was calculated by measuring a full width at half maximum by an X-ray diffractometer and inputting thus obtained value into the following Scherrer equation:

$$\text{Crystallite size (Å)} = K \cdot \lambda (\beta \cdot \cos \theta) \quad (1)$$

wherein the Scherrer factor was 0.9.

Observation of active material particle forms

Forms of active material particles were observed through a transmission electron microscope (product name: JEM-2100F manufactured by JEOL Ltd.).

[Measurement of the Discharge Capacity]

Thus obtained active material and a mixture of polyvinylidene fluoride (PVDF) as a binder and acetylene black were dispersed into N-methyl-2-pyrrolidone (NMP) acting as a solvent, so as to prepare a slurry. The slurry was prepared such that the active material, acetylene black, and PVDF had a weight ratio of 84:8:8 therein. The slurry was applied onto an aluminum foil acting as a current collector, dried, and then extended under pressure, so as to yield an electrode (positive electrode) formed with an active material layer containing the active material of Example 1.

Thus obtained electrode and an Li foil acting as its counter electrode were subsequently laminated with a separator made of a microporous polyethylene film interposed therebetween, so as to yield a multilayer body (matrix). This multilayer body was put into an aluminum-laminated pack, a 1M $LiPF_6$ solution was injected therein as an electrolytic solution, and then the pack was sealed in vacuum, so as to make an evaluation cell of Example 1.

Using the evaluation cell of Example 1, the discharge capacity (unit: mAh/g) with a discharge rate of 1 C (the current value by which constant-current discharging at 25° C. completed in 1 hr) in the second cycle was measured. The discharge capacity at 1 C was 143 mAh/g. Table 1 lists the results.

EXAMPLE 2

The active material and evaluation cell of Example 2 were obtained as same manner in Example 1 except that citric acid and ethylene glycol were mixed at a molar ratio of 1:4 while water in the aqueous solution A was 42 ml in the making of the active material.

EXAMPLE 3

The active material and evaluation cell of Example 3 were obtained as same manner in Example 1 except that citric acid and ethylene glycol were mixed at a molar ratio of 1:8.3 while water in the aqueous solution A was 51 ml in the making of the active material.

EXAMPLE 4

The active material and evaluation cell of Example 4 were obtained as same manner in Example 1 except that citric acid and ethylene glycol were mixed at a molar ratio of 1:12.8 while water in the aqueous solution A was 69 ml in the making of the active material.

EXAMPLE 5

The active material and evaluation cell of Example 5 were obtained as same manner in Example 1 except that citric acid and ethylene glycol were mixed at a molar ratio of 1:15.2 while water in the aqueous solution A was 75 ml in the making of the active material.

Comparative Example 1

The active material and evaluation cell of Comparative Example 1 were obtained as same manner in Example 1 except that citric acid and ethylene glycol were mixed at a molar ratio of 1:1 while water in the aqueous solution A was 55 ml in the making of the active material.

Comparative Example 2

The active material and evaluation cell of Comparative Example 2 were obtained as same manner in Example 1 except that citric acid and ethylene glycol were mixed at a molar ratio of 1:0.8 while water in the aqueous solution A was 69 ml in the making of the active material.

TABLE 1

| | Molar ratio of ethylene glycol to citric acid | | Crystallite size | Peak intensity ratio | Peak intensity ratio | Discharge capacity |
|---|---|---|---|---|---|---|
| | Citric acid | Ethylene glycol | (nm) | d(020)/d(111) | d(020)/d(311) | at 1 C (mAh/g) |
| Example 1 | 1 | 1.5 | 88 | 1.02 | 1.00 | 143 |
| Example 2 | 1 | 4 | 75 | 1.05 | 1.02 | 145 |
| Example 3 | 1 | 8.3 | 59 | 1.03 | 1.03 | 148 |
| Example 4 | 1 | 12.8 | 54 | 1.04 | 1.02 | 151 |

TABLE 1-continued

|  | Molar ratio of ethylene glycol to citric acid | | Crystallite size (nm) | Peak intensity ratio d(020)/d(111) | Peak intensity ratio d(020)/d(311) | Discharge capacity at 1 C (mAh/g) |
| --- | --- | --- | --- | --- | --- | --- |
|  | Citric acid | Ethylene glycol | | | | |
| Example 5 | 1 | 15.2 | 38 | 1.06 | 1.02 | 149 |
| Comparative Example 1 | 1 | 1 | 100≦ | 0.97 | 0.95 | 131 |
| Comparative Example 2 | 1 | 0.8 | 100≦ | 0.95 | 0.91 | 129 |

The foregoing results showed that Examples 1 to 5 in which the ratio of the ethylene glycol content to the citric acid content was at least 1.5 greatly increased the discharge capacity at 1 C as compared with Comparative Examples 1 and 2 in which the ratio of the ethylene glycol content to the citric acid content was 1 or less. The crystallite size of active material particles obtained by the methods of Examples 1 to 5 was less than 100 mm and much smaller than that of active material particles of Comparative Examples 1 and 2 corresponding to the prior art. Each of d(020)/d(111) and d(020)/d(311) in Examples 1 to 5 was 1.00 or greater, whereby a tendency to have an orientation to the (020) plane was seen.

Figure 3:
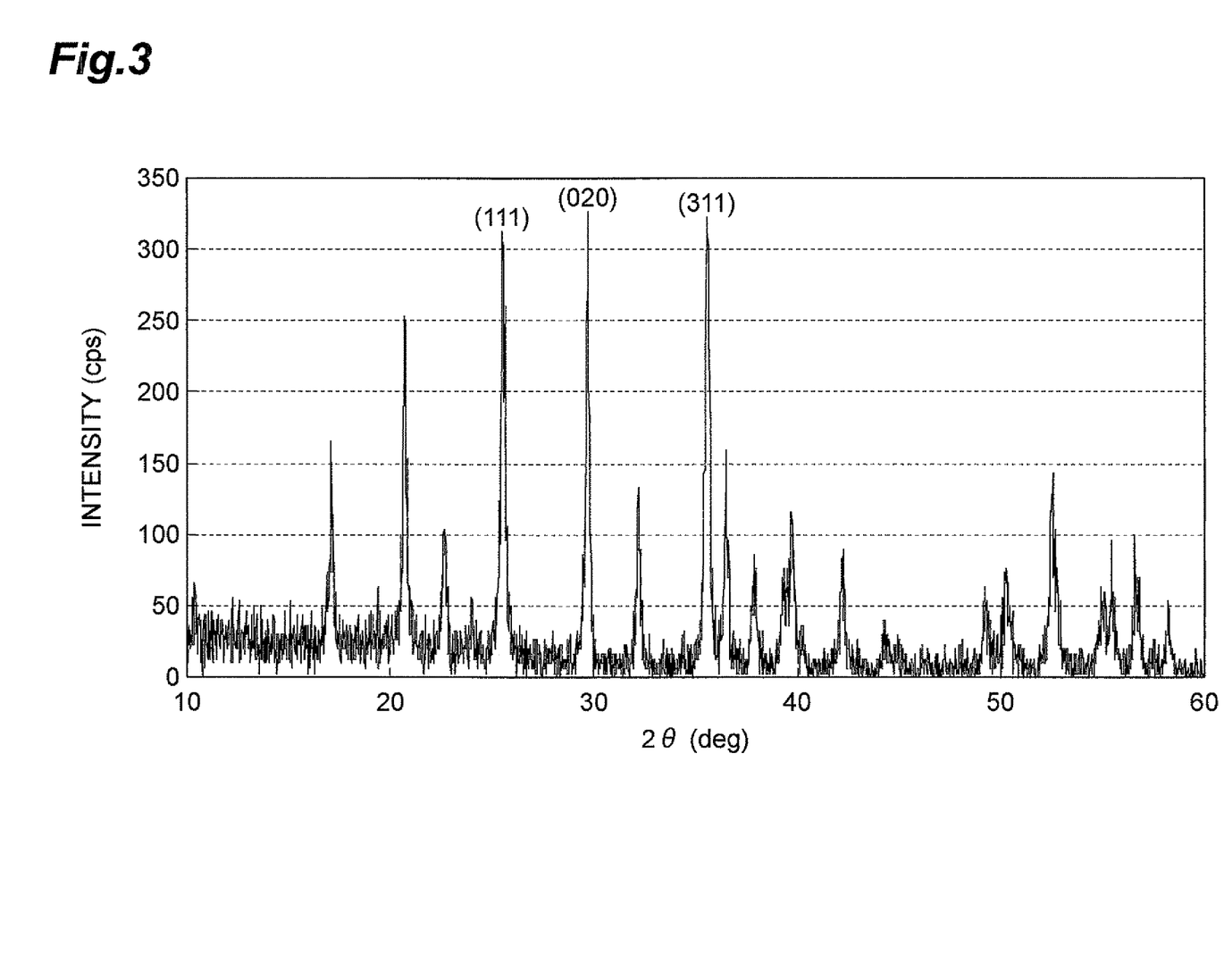
[FIG. 3] is an X-ray diffraction pattern of the active material obtained in Example 2.
Figure 4:
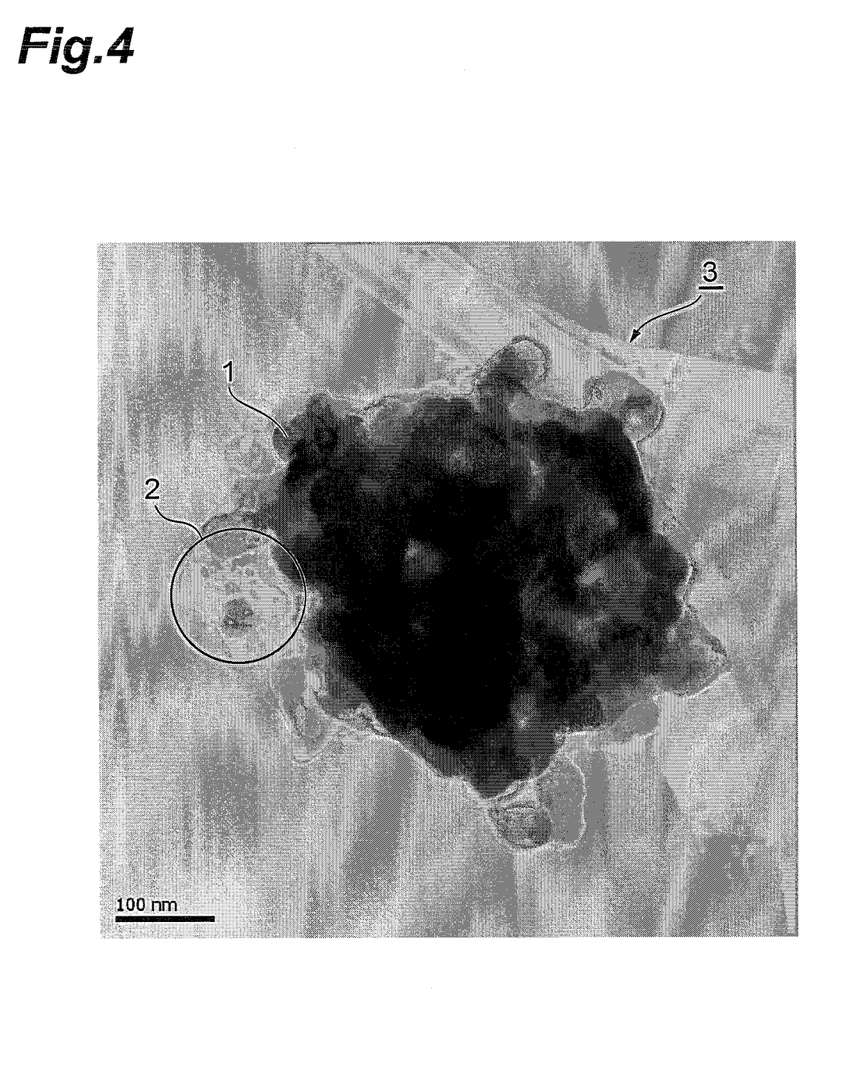
[FIG. 4] is a TEM image of the active material obtained in Example 2.

As a specific result, FIG. 3 illustrates an XRD pattern of the active material of Example 2. The peak intensity attributable to the (020) plane was higher than that attributable to the (111) plane, whereby the calculated d(020)/d(111) was 1.05. The peak intensity attributable to the (020) plane was higher than that attributable to the (311) plane, whereby the calculated d(020)/d(311) was 1.02. This showed that thus obtained active material had an orientation to the (020) plane. In the active material 3 of Example 2, the active material particles 1 aggregated, so as to form one active material particle group as illustrated in FIG. 4. An EELS analysis of the active material particle group with the above-mentioned transmission electron microscope showed that the carbon particles 2 were supported on the surfaces of the active material particles mainly composed of $LiFePO_4$. The carbon particles 2 partly formed a layer and partly became a mass.

As in the foregoing, the method of manufacturing an active material in accordance with the present invention can yield a lithium-ion secondary battery having a sufficient discharge capacity at a high discharge current density.

What is claimed is:

1. A method of manufacturing an active material, the method comprising:
a step of polymerizing a mixture containing an Fe ion, an Li ion, a $PO_4$ ion, a hydroxy acid, and a polyol, the mixture containing the polyol by a molar ratio 1.3 to 16 times that of the hydroxy acid, so as to yield a polymer; and
a step of heating the polymer, so as to yield an active material containing an active material particle and carbon, the active material particle being mainly composed of $LiFePO_4$.

2. The method of manufacturing the active material according to claim 1, wherein iron nitrate is a source for the Fe ion, lithium chloride is a source for the Li ion, and ammonium hydrogen phosphate is a source for the $PO_4$ ion.

3. An active material comprising:
an active material particle group constructed by aggregating active material particles, mainly composed of $LiFePO_4$, having an orientation to a (020) plane and a crystallite size of 30 to 99 nm; and
carbon particles supported on a surface of the active material particle.

4. An electrode comprising a current collector and an active material layer, disposed on the current collector, containing the active material according to claim 3.

5. A lithium-ion secondary battery comprising the electrode according to claim 4.

* * * * *